United States Patent Office 3,143,317
Patented Aug. 4, 1964

3,143,317
SUPERSONIC AIRCRAFT
Gerald David Walley, Freckleton, and Frank Gerrie Willox, Lytham St. Annes, England, assignors to The English Electric Company Limited, London, England, a British company
Filed Oct. 30, 1961, Ser. No. 148,547
Claims priority, application Great Britain Nov. 18, 1960
2 Claims. (Cl. 244—42)

The present invention relates to supersonic aircraft having a slender wing, which is defined as a wing having a sharp leading edge swept back at an angle of at least 60° from a spanwise line and an aspect ratio not exceeding 2. The plan configuration of the wing may be delta-, gothic- or ogee-shaped.

Slender wings as defined hereinabove have a lift-co-efficient $C_L$ which for a given angle of incidence is very low compared to that of conventional wings of higher aspect ratio and less pronounced sweep back of the leading edge. Accordingly a very high angle of incidence is required in order to attain a practicable approach and landing speed with a slender wing aircraft. This involved hitherto a very long, complicated and heavy undercarriage and made it also very difficult to provide adequate vision for the pilot. In order to attain a practicable approach speed at an angle of incidence of 10° to 12° some type of high lift device has to be fitted to a slender wing aircraft.

According to the invention nose flaps are hinged about a substantially transverse axis and linked to pilot operated controls in the sense of being deflected upward for producing a lift increment at high angles of incidence of said slender wings.

Nose flaps deflected downward in order to increase the lift co-efficient by increasing the useable incidence have been known for conventional wings, and it is an inventive merit to have overcome the view that a downward deflection is required for producing a lift increment when using on slender wings the nose flaps, known per se.

The upward deflection of the nose flaps at high angles of incidence of a slender wing is accompanied by a nose-up pitching moment, which is counteracted by a downward deflection of conventional trailing edge flaps, resulting in a further lift increment.

In order that the invention may be clearly understood and readily carried into effect an embodiment thereof will now be described by way of example with reference to the accompanying drawing in which:—

Figure 1:
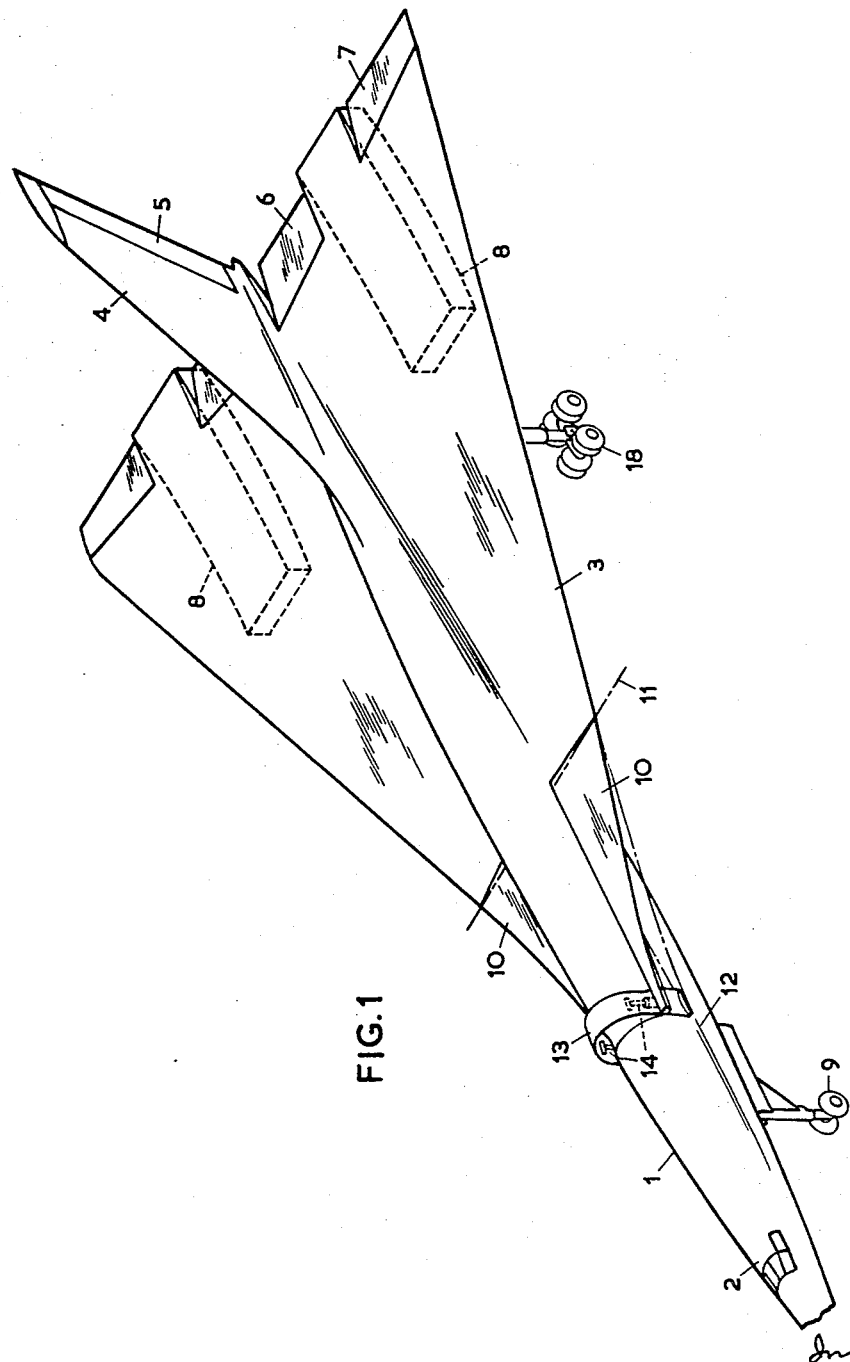
FIG. 1 is a diagrammatic perspective view of a slender wing supersonic aircraft according to the invention.

The supersonic aircraft according to the embodiment illustrated has a fuselage 1 with crew cockpit 2 and a slender wing 3 as defined hereinabove, a swept back dorsal fin 4 and rudder 5 and trailing edge flaps 6 and 7 inboard and outboard the engine nacelles 8 serving for pitch control when deflected in unison, and for roll control when deflected differentially. A retractable multi-wheel bogie main undercarriage 18 and a retractable nose-wheel undercarriage 9 support the aircraft on the ground.

A pair of nose flaps 10, shown in full lines in the position deflected upward, are hinged on the fuselage 1 about a spanwise hinge line 11. Provisions are made for obviating gaps at the hinges and roots of the nose flaps 10 in order to prevent serious losses of lift. As indicated by a chain-dotted line the nose flaps 10 when not deflected line up with strakes 12 faired into the forward portion of the fuselage.

The two nose flaps 10 are coupled with one another by a horse-shoe shaped yoke 13, and are operated by jacks or actuators 14 mounted on the fuselage 1. In the non-deflected position the yoke 13 retracts flush into the top of the fuselage 1. In operation the trailing edge flaps 6 and/or 7 are deflected downward simultaneously with deflecting the nose flaps 10 upward.

Figure 2:
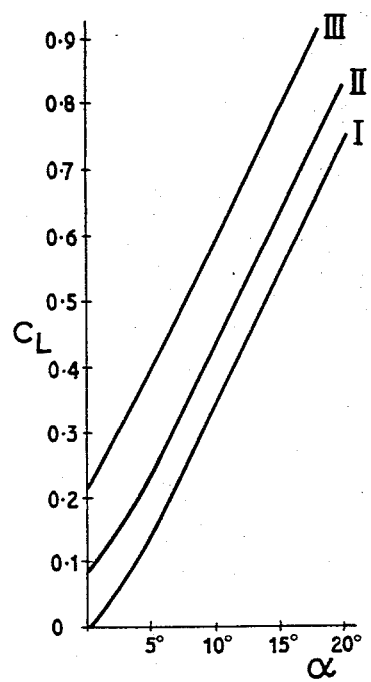
FIG. 2 is a graph plotting the lift co-efficient $C_L$ against angle of incidence $\gamma$.
Figure 3:
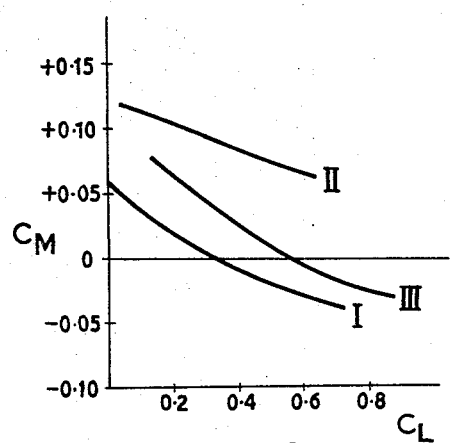
FIG. 3 is a graph plotting the pitching moment co-efficient $C_M$ about the centre of gravity of the aircraft against the lift co-efficient $C_L$.

In the FIGS. 2 and 3, graphs I are the basic slender wing without deflection of either nose flaps or trailing edge flaps. Graphs II are for the basic wing with the nose flaps deflected upward, and graphs III are for the basic wing with the nose flaps deflected upward and the trailing edge flaps simultaneously deflected downward.

As will be seen in FIG. 2 by comparison with graph I at an angle of incidence of 10° the lift increment obtained by the upward deflection of the nose flaps alone is 0.085 (graph II) and by the nose flaps deflected upward and the trailing edge flaps simultaneously deflected downward the lift increment is 0.24 (graph III). This increment could not be obtained without simultaneous upward deflection of the nose flaps, since the pitching moments resulting from these deflections trim one another out and would each per se not be acceptable.

This becomes clear from FIG. 3, graph I, which shows a negative pitching moment for the basic wing at lift co-efficients exceeding $C_L=0.34$; graph II shows strong positive pitching moments for the basic wing with nose flaps only deflected (upward), and graph III shows that for simultaneous upward deflection of the nose flaps and downward deflection of the trailing edge flaps the pitching moment co-efficient $C_M$ is zero for a lift co-efficient $C_L=0.58$ i.e. an angle of incidence of 10° (FIG. 2).

For an aircraft to have reasonable flying qualities, it is necessary that for any high lift device, the slope of the $C_M$ and $C_L$ curve should not change much over the usable $C_L$ range and also that the slopes of the basic wing curve and that of the basic wing plus high lift device should be similar. Also for the aircraft to be balanced, the value of $C_M$ at landing incidence should be zero for basic wing and basic wing plus high lift device.

It will be noted that relative to the basic wing case, deflecting the nose flap upwards results in a curve which has a similar slope, but as stated, the pitching moment at $C_L$ has considerably increased, resulting in a nose-up pitching moment. To trim out this nose-up pitching moment at landing incidence the trailing edge controls are deflected downwards so that $C_M$ is zero. Thus it follows from FIG. 3 that for a landing incidence of 10°, and with the aircraft balanced, the increase in lift co-efficient for the aircraft fitted with the combined high lift device according to the invention is 0.24 greater than that for an aircraft with the basic wing. Or in other words the decrease in landing incidence for a lift co-efficient of 0.58 for the aircraft with the high lift device, relative to that for the aircraft with the basic wing, is 5.8°.

Figure 4:
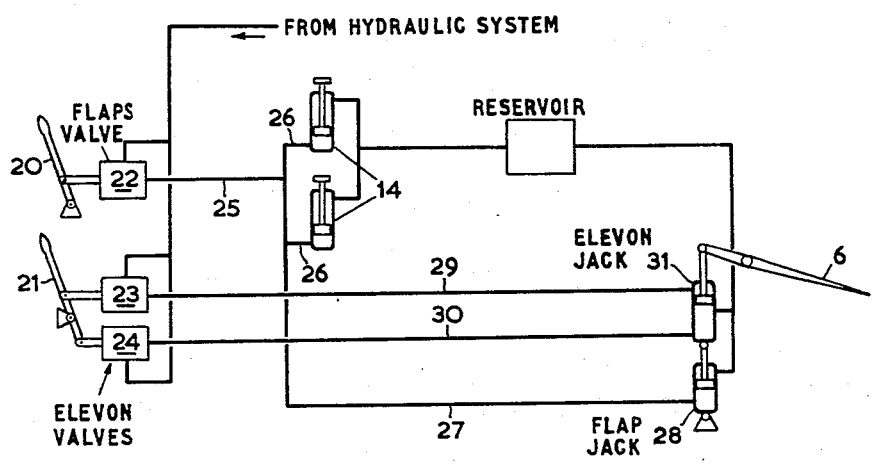
FIG. 4 is a pipe line diagram of the hydraulic control circuits.

Referring now to FIG. 4 two control sticks 20, 21 are provided in the cockpit 2 which operate a flap valve 22 and two elevon valves 23, 24, respectively, the inlets of which are connected to a source of hydraulic pressure (not shown) in the aircraft. The outlet of the flap valve 22 is connected by a pipe 25 to two branch pipes 26 leading to the jacks 14 of the yoke 13, and by a pipe 27 to a flap actuator jack 28. The elevon valves 23, 24 are connected by pipes 29, 30 to a double-acting elevator jack 31 arranged on the flap actuator jack 28 and coupled to the port side trailing edge flaps 6, 7. The outlets of all jacks 14, 28, 31 are connected to a hydraulic reservoir (not shown) at the low pressure side of the aforesaid source of hydraulic pressure. The starboard trailing edge flaps are similarly connected and can be operated in unison with the port trailing edge flaps as elevators, or differentially as ailerons, (hence the well known term "elevon").

By operating the stick 20 the nose flaps 10 are tilted up and simultaneously the trailing edge flaps 6, 7 are depressed, by the flap actuator jack 28 moving the elevon jack as a whole. By operating the stick 21 the elevon jack 31 may be contracted or expanded, thus producing the control movement desired of the trailing edge flaps 6, 7 starting from their position as adjusted by the stick 20.

What we claim as our invention and desire to secure by Letters Patent is:

1. A supersonic aircraft comprising in combination: a fuselage, a slender wing of triangular plan configuration attached to said fuselage, triangular nose flaps forming the forward apex of said wing, and hinged to said fuselage about a substantially transverse axis, pilot-operated controls in said fuselage linked to said nose flaps in the sense of deflecting the same upward for producing a lift increment at high angles of incidence of said slender wing, trailing edge flaps hinged to said slender wing and coupled to said nose flaps in the sense of being deflected downward for producing a lift increment at high angles of incidence of said slender wing and for balancing the nose-up pitch moment produced by the upward deflection of said nose flaps.

2. A supersonic aircraft comprising in combination: a fuselage, a slender wing of triangular plan configuration attached to said fuselage, triangular nose flaps forming the forward apex of said wing, and hinged to said fuselage about a substantially transverse axis, pilot-operated controls in said fuselage linked to said nose flaps in the sense of deflecting the same upward for producing a lift increment at high angles of incidence of said slender wing, and a horseshoe-shaped yoke coupling the starboard and port nose flaps with one another, and in the non-deflected position of said flaps retracting flush into the top of said fuselage.

References Cited in the file of this patent

UNITED STATES PATENTS

| | | |
|---|---|---|
| 884,432 | Vaniman | Apr. 14, 1908 |
| 1,732,873 | Yock | Oct. 22, 1929 |
| 2,503,585 | Loedding | Apr. 11, 1950 |
| 2,568,021 | Northrop | Sept. 18, 1951 |
| 2,944,765 | Lane et al. | July 12, 1960 |

OTHER REFERENCES

An article entitled, Nazi Jet-Bats Which Never Took Wings, by E. J. Bulban on pages 172 and 173 of Aviation, October 1945.